(12) United States Patent
Hamm et al.

(10) Patent No.: US 9,805,135 B2
(45) Date of Patent: Oct. 31, 2017

(54) SYSTEMS AND METHODS FOR UPDATING RICH INTERNET APPLICATIONS

(75) Inventors: Chris Hamm, Sellersburg, IN (US); Andrew Lottmann, Albany, CA (US)

(73) Assignee: CBS INTERACTIVE INC., San Francisco, CA (US)

( * ) Notice: Subject to any disclaimer, the term of this patent is extended or adjusted under 35 U.S.C. 154(b) by 937 days.

(21) Appl. No.: 13/076,069

(22) Filed: Mar. 30, 2011

(65) Prior Publication Data

US 2012/0254720 A1    Oct. 4, 2012

(51) Int. Cl.
| | | |
|---|---|---|
| *G06F 17/00* | (2006.01) | |
| *G06F 17/20* | (2006.01) | |
| *G06F 17/21* | (2006.01) | |
| *G06F 17/22* | (2006.01) | |
| *G06F 17/24* | (2006.01) | |
| *G06F 17/25* | (2006.01) | |
| *G06F 17/26* | (2006.01) | |
| *G06F 17/27* | (2006.01) | |
| *G06F 17/28* | (2006.01) | |
| *G06F 17/30* | (2006.01) | |

(52) U.S. Cl.
CPC .............................. *G06F 17/30899* (2013.01)

(58) Field of Classification Search
CPC ............. G06F 17/2247; G06F 17/3089; G06F 17/30899; G06F 17/30905
USPC .......................................... 715/234; 709/206
See application file for complete search history.

(56) References Cited

U.S. PATENT DOCUMENTS

| | | | | |
|---|---|---|---|---|
| 7,117,436 | B1* | 10/2006 | O'Rourke et al. ............ | 715/205 |
| 7,299,409 | B2* | 11/2007 | Joshi et al. .................... | 715/234 |
| 7,571,219 | B2* | 8/2009 | Cejka et al. ................... | 709/219 |
| 8,589,777 | B1* | 11/2013 | Baer et al. ..................... | 715/200 |
| 2006/0041623 | A1* | 2/2006 | Danninger .................... | 709/206 |
| 2006/0190561 | A1* | 8/2006 | Conboy et al. ............... | 709/217 |
| 2008/0010654 | A1* | 1/2008 | Barrett et al. .................. | 725/32 |
| 2009/0070190 | A1* | 3/2009 | Gorty et al. .................... | 705/10 |
| 2009/0094249 | A1* | 4/2009 | Hawkins ......................... | 707/10 |
| 2009/0198662 | A1* | 8/2009 | Prabhakar et al. ............... | 707/3 |
| 2010/0114720 | A1* | 5/2010 | Jones et al. ................ | 705/14.73 |
| 2012/0011431 | A1* | 1/2012 | Mao .............................. | 715/234 |

* cited by examiner

*Primary Examiner* — Manglesh M Patel
*Assistant Examiner* — Nicholas Hasty
(74) *Attorney, Agent, or Firm* — Rimon, P.C.; Marc S. Kaufman

(57) ABSTRACT

Systems, computer-implemented methods, and media for updating content of a page composed of markup language in response to a triggering event method include: receiving a request that indicates a triggering event; determining the type of triggering event based on the request; determining at least one page element from amongst plural page elements of the page to be updated based on the request; generating a response to the request, the response including metadata indicating the at least one page element and the content of the at least one page element, the content of the at least one page element being composed of the markup language; and transmitting the response.

10 Claims, 6 Drawing Sheets

SYSTEMS AND METHODS FOR UPDATING RICH INTERNET APPLICATIONS

BACKGROUND

Systems and methods exist for refreshing and updating content on websites. Conventional systems and methods generally send the entire hypertext markup language ("HTML") of the website to refresh a page (i.e., perform a full page refresh). This is inconvenient because the entire user interface provided by the website is disrupted while the website refreshes. Additionally, conventional page refreshing uses a great amount of processing and bandwidth resources to receive and render the entire page again.

A Rich Internet Application ("RIA") is a website, application, game, widget, etc., that can dynamically load content, such as page content or advertising, without reloading the entire website or application. RIAs are accessed through web browsers or clients and, unlike traditional applications, require no software installation. RIAs generally implement client-side code, such as JavaScript code, or other client-side technologies, such as Asynchronous JavaScript and XML ("AJAX") or JavaScript Object Notation ("JSON") technologies, to refresh content by requesting additional data and then reassembling the data in the browser, i.e., at the client side. These systems and methods require a request to go back and forth to update each section of the page. In other words, to update every page section, a unique request must be generated and transmitted. Also, the markup code must be reassembled. Thus, these systems and methods are resource intensive and reduce the effectiveness of websites as dynamic user interfaces.

While systems and methods are described herein by way of example and embodiments, those skilled in the art recognize that systems and methods for dynamically updating RIAs are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Disclosed embodiments provide computer-implemented methods and systems for updating web pages and RIAs. Embodiments may provide page models and protocols that allow one or more page elements of a dynamic webpage to refresh in their entirety in response to a single request. Embodiments may generate updated page elements remotely from a client computing device, transmit the updated page elements to the client computing device, and the client computing device may insert the updated page elements in their entirety into the dynamic page.

Figure 1:
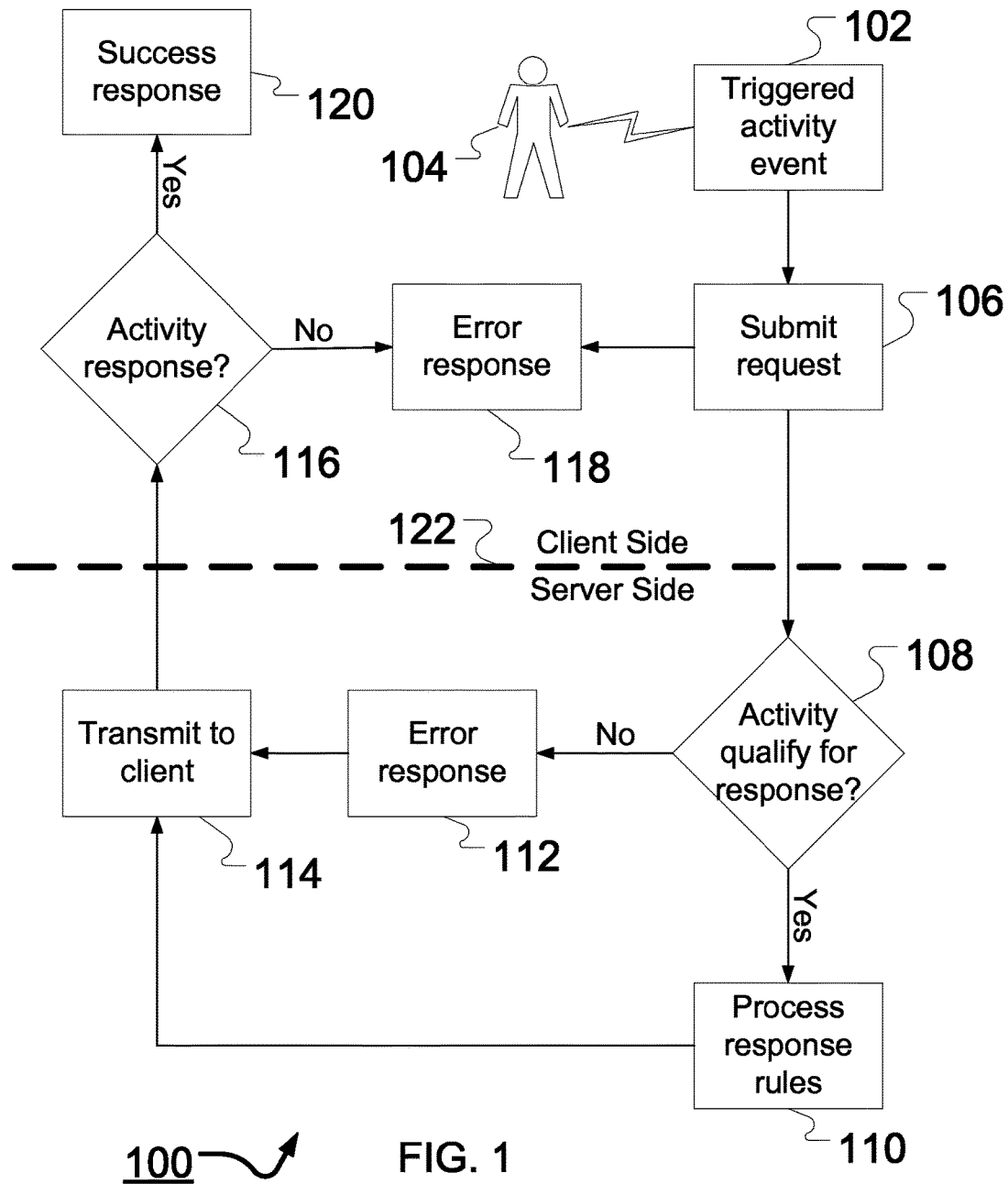
FIG. 1 is a data flow showing an exemplary process for dynamically updating content in a webpage.

FIG. 1 is a data flow 100 showing an exemplary process for dynamically updating content in a webpage. At block 102, a computing device identifies the occurrence of a triggering activity event. A triggering activity event may be a user 104 interaction with a page, for example the user clicking (e.g., left-clicking, right-clicking, double-clicking, etc.), moving a mouse over a specific object on the webpage, or "scrubbing" an object on the webpage (i.e., moving a scroll bar so that the user can see the object). The triggering activity may be a Strong User Action as defined by the Interactive Advertising Bureau ("IAB"), a trade association of leading media and technology companies who are responsible for selling a majority of online advertising in the United States. Alternatively, a triggering event may be any other event associated with the page, for example streaming media may cause a triggering event at a break in live coverage (e.g., for live sports or news coverage) or at the termination of a media stream or download. Still other triggering events may be otherwise associated with the client computing device, for example a triggering event may be a passage of a determined amount of time from an initial page load or from a page element refresh.

At block 106, after identifying a triggering event, a computing device transmits a request for new content for the page. New content may be content in addition to what was previously on the page or refreshed content to replace existing content on a page. A page element, including new or refreshed content for insertion into the page, may be requested by the computing device. The transmitted request may include an identifier for the activity event (e.g., an activity event name or ID specifying what activity event triggered the transmission of the request) along with other data. If the event ID is not valid or is not recognized, the process may proceed to block 118, otherwise the process proceeds to block 108.

At block 108, a computing device receives the transmitted request and determines whether the triggered activity event qualifies for a response. A computing device may compare the activity event name or ID with a list of activities or a set of rules to determine an appropriate response. For example, a first activity event ID may be on a list specifying that a creative (e.g., an ad) should be refreshed while a second activity event ID may be on a list specifying that additional page elements (e.g., search results, streaming video, etc.) should be refreshed in addition to a creative. If at block 108 a computing device determines that the triggering activity event qualifies for a response, the process proceeds to block 110. Alternatively, the process proceeds to block 112 and a computing device transmits an error response back to the browser indicating that the triggering activity event failed to qualify for a response.

At block 110, a computing device determines which page element or page elements, and the content comprising each page element, to transmit back based on the activity event name or ID. A computing device may then request the content to insert in each page element, for example by querying a local or remote database, and generate each page element. The one or more page elements may be any format that may be directly inserted into the dynamic webpage, for example a page element may be composed of a markup language, such as HTML. A computing device may then package the one or more page elements to be inserted into the website within a response. The response additionally includes metadata configured to instruct the dynamic webpage where to insert each page element contained in the response. The response may be, for example, an XML response encapsulating one or more HTML page element. The XML response may include metadata generated by a computing device describing what each HTML page element is and where each HTML page element goes.

Of course, the response may additionally include other content and the metadata may include instructions regarding the other content or any other data. For example, a computing device may determine that, based on the activity event name or ID, one or more creatives, such as static or dynamic ads, on the page should be refreshed. In this case, in addition to any page elements to be inserted into the dynamic page, the response may include one or more creatives and the metadata may identify each creative and instruct the page where each creative may be inserted. The creatives may also be in a markup language that may be directly inserted into the page, for example HTML. Alternatively, the creatives may be objects, such as JSON or packaged JSON ("JSONP") objects that may request additional content to be inserted into the dynamic page. Moreover, while creatives may be included in the response in addition to one or more page elements, in situations where a rule or rules define that no page element should be refreshed, a rule may still provide that one or more creatives, or other content on the page, should be refreshed. In such a case, the response may include the creatives or other content configured to be inserted into the page as well as metadata instructing the page what creatives or other content is included in the response and instructing the page where the creatives or other content are to be inserted in the page. A computing device may then transmit the response (e.g., XML encapsulated HTML) back to the browser executed on a computing device.

At block 114, the error response from block 112 or the XML encapsulated HTML from block 110 may be transmitted back to a client computing device. At block 116, a client computing device receives from a server computing device either an indication from block 112 that the triggering event failed to qualify for a response or a response from block 110. If an error response was received from block 112, the process proceeds to block 118 and the browser receives an indication that the triggering activity event failed to qualify for a response. Alternatively, the process may proceed to block 120 and the browser may insert the one or more received page elements into the webpage according to the received metadata. Of course, if the response included any other content, such as creatives, the other content may also be inserted into the page according to the metadata. Additional functions, such as JavaScript functions, may also be performed on the client side. For example, a JavaScript function may be executed to define user interface features of one or more received page elements.

Data flow 100 is dynamic and may receive additional triggering activity events at any time and may proceed through the process any number of times. Additionally, FIG. 1 provides a client side/server side divider line 122 indicating processing occurring on the client side and on the server side. Thus, data flow 100 not only allows for refreshing or fetching multiple page elements in response to a single request, but additionally shifts processing to the server side, thereby allowing the RIA to provide a more dynamic and responsive user interface by reducing data transmission and client-side processing. This may provide an especially useful user interface for a mobile device (e.g., smartphone, netbook, tablet, etc.) having reduced resources.

The plural blocks of data flow 100 may be implemented as modules executed by plural computing devices in communication with each other. The functional division of various blocks is provided for ease of understanding the process only, and in practice one or more blocks may be combined into fewer functional blocks, one or more blocks may be further subdivided into sub-blocks, one or more blocks (e.g., error handling blocks) may be removed from the process, and one or more additional blocks may be added to the process. Thus, process 100 discloses a process for updating content in one or more page element or other page content in response to a triggering event.

Figure 2:
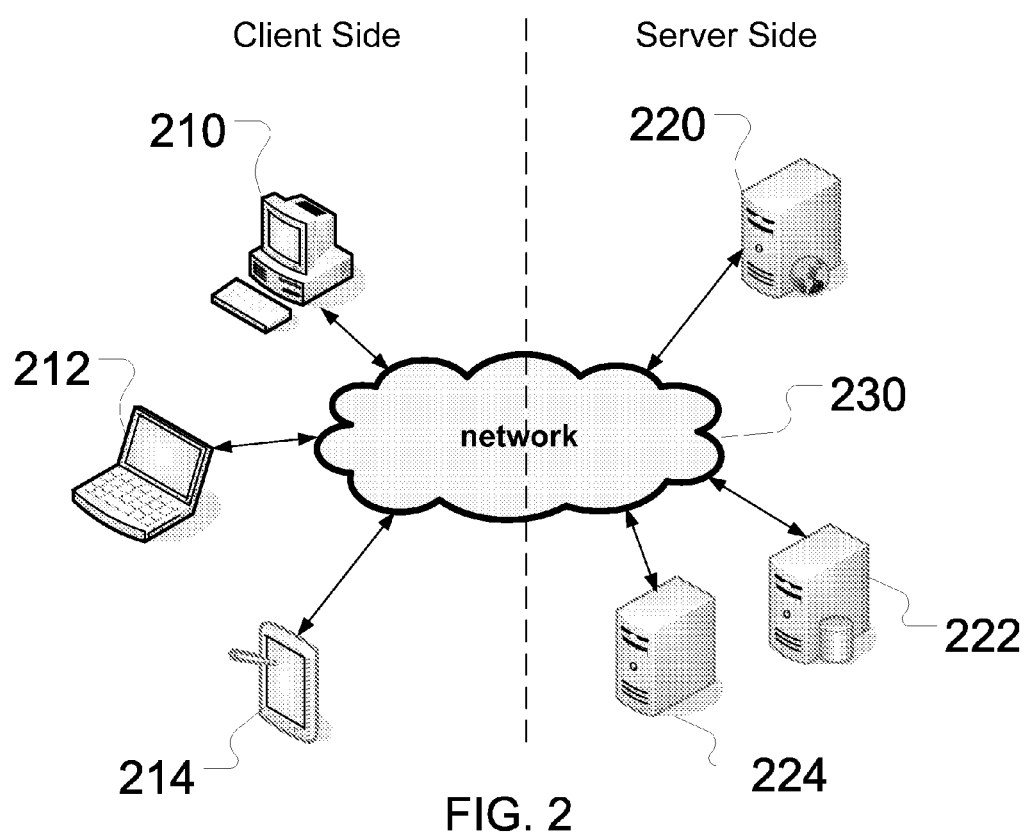
FIG. 2 is a schematic diagram of a computing architecture useful for performing the data flow shown in FIG. 1.

FIG. 2 is a schematic diagram of a computing architecture useful for performing data flow 100. FIG. 2 includes multiple client side computing devices, such as a desktop computing device 210, a laptop computing device 212, and a tablet computing device 214, operatively coupled to a server computing device 120 via a network 230. Of course, a client computing device may be any one or more computing device configured to receive and render a website or RIA in a browser. A server computing device may be one or more computing device configured to refresh content of the website or RIA in response to a triggering activity event. Network 230 may be any communication medium coupling a client computing device to a server computing device, for example the Internet. The server side may include plural servers, for example server computing device 220 may be a web server (e.g., running APACHE™ or other web serving software) which may be in communication with a database server computing device 222 and an ad server computing device 224 among other computing devices. For example, at block 110 of FIG. 1, a web server computing device 220 may request content for generating one or more page elements to insert in an RIA from a database server computing device 222 and may request ad content for insertion into an RIA from ad server computing device 224. A firewall may separate the server side from the client side computing devices. Of course, the computing architecture shown in FIG. 2 is exemplary only, and alternative computing architectures, for example a cloud architecture, may also be used.

Figure 3:
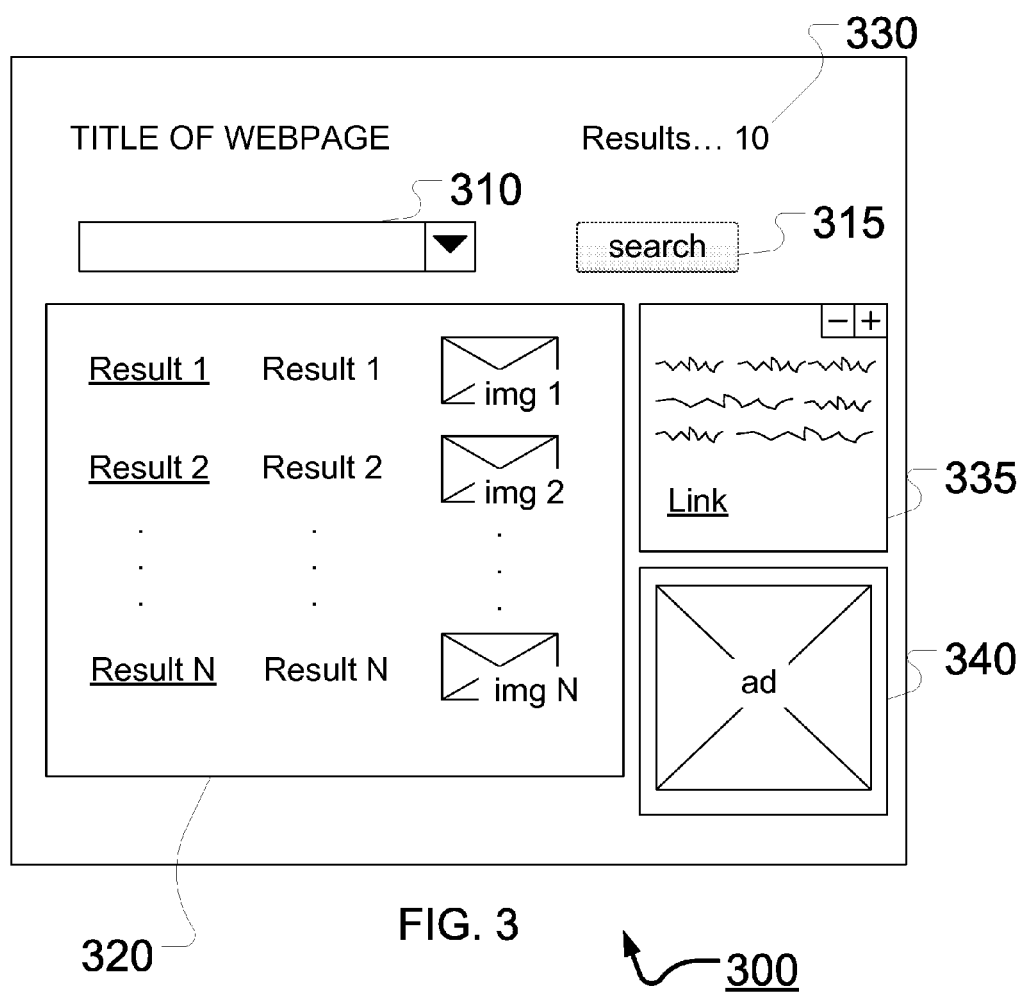
FIG. 3 is a schematic view of an exemplary dynamic webpage.

FIG. 3 is a schematic view of an exemplary dynamic webpage 300. Webpage 300 includes various page elements (e.g., components) that may be dynamically refreshed in response to a triggering activity event. Within each page element is tagged content expressed in a markup language such as HTML. For example, a page element may be HTML content tagged with a name associated with the page element (i.e., an id attribute tag of the HTML equals a name of the page element). This allows a response to include metadata setting forth the tag name for the page element and the associated page element so that the page element may be inserted in the appropriate place in the page. For example, HTML code may be configured to be inserted directly into one or more page element on the page and XML may define HTML id tag names identifying which page element receives each section of HTML code.

For example, webpage 300 includes a search results page element 320, a results count page element 330, and a link page element 335. Search results page element 320 may have an element name "resultItems" and HTML "<ul><li><a href>Result 1</a>Result 1<img src="resultImg"></li> . . . ", results count page element 330 may have an element name "resultsCount" and HTML "<div>Results . . . 10</div>", and link page element 335 may have a name "moduleFoo" and HTML "<div id="WidgetX">text text text . . . <a href>link</a>".

After a user types a search term in search box 310, a user may select (e.g., click on) search button 315. Selection of search button 315 may be a triggering event activity. The client computing device may then transmit a request including an activity event ID, indicating that the activity event was a user selecting the search button 315, and the search term entered in search box 310. For example, a JavaScript function executed on the client device may generate a universal resource locator ("URL") indicating that the activity name, the search term, and any other information that should be passed to a server computing device. For example, a URL "http://domain.com/hashdata&activityname= querySearch&isadevent=true&searchterm=laptops" may indicate to a server computing device the activity name is "querySearch", that the activity event is an ad event (i.e., that one or more ads on the page should be refreshed), and that the search term entered in search box 310 is "laptops". Alternatively, the entire URL may be otherwise encoded (e.g., hashed) or the activity name, search term, and any other information may be transmitted to a server computing device in an alternative fashion.

A server computing device may then compare the activity event ID to one or more rules to determine which elements on the page should be refreshed. For example, a rule for "querySearch" may indicate that a database on the server side should be queried for records corresponding to the search term (e.g., "laptops"), that search results page element 320 should be formatted as HTML, or another markup language used by the page, and include a list of search results, that results count page element 330 should receive an HTML DIV having the search results count (i.e., a count of the number of records satisfying the query), and that link page element 135 should not be refreshed. Additionally, an indication that the activity event is an ad event (i.e., that the activity event warrants another ad impression request) may cause a server computing device to request a new creative (e.g., in HTML form) to be inserted into the page to replace ad 340. Search results page element 320, results count page element 330 and ad 340 may all be packaged in a single response file, the response file including metadata indicating each page element name and where each respective page element is to be inserted into the webpage. The server computing device may then transmit the response file back to the client computing device.

At the client computing device, the browser may insert the content of the various page elements (e.g., HTML content) into the page elements on the website according to the response metadata.

While the above example indicates that an ad should be refreshed because a specific tag received from the client side indicates that an ad should be refreshed, alternatively an activity event name may be associated with a rule that indicates that an ad should be refreshed.

Thus, methods and systems disclosed herein allow multiple page elements to be dynamically refreshed in response to a single request. Page elements may be simultaneously refreshed according to rules. Additionally, because the page is dynamic and may refresh in response to any triggering activity event, elements may be asynchronously refreshed. Further, rules may provide for any sequencing or delay in refreshing page elements or ads after a triggering activity event.

Figure 4A:
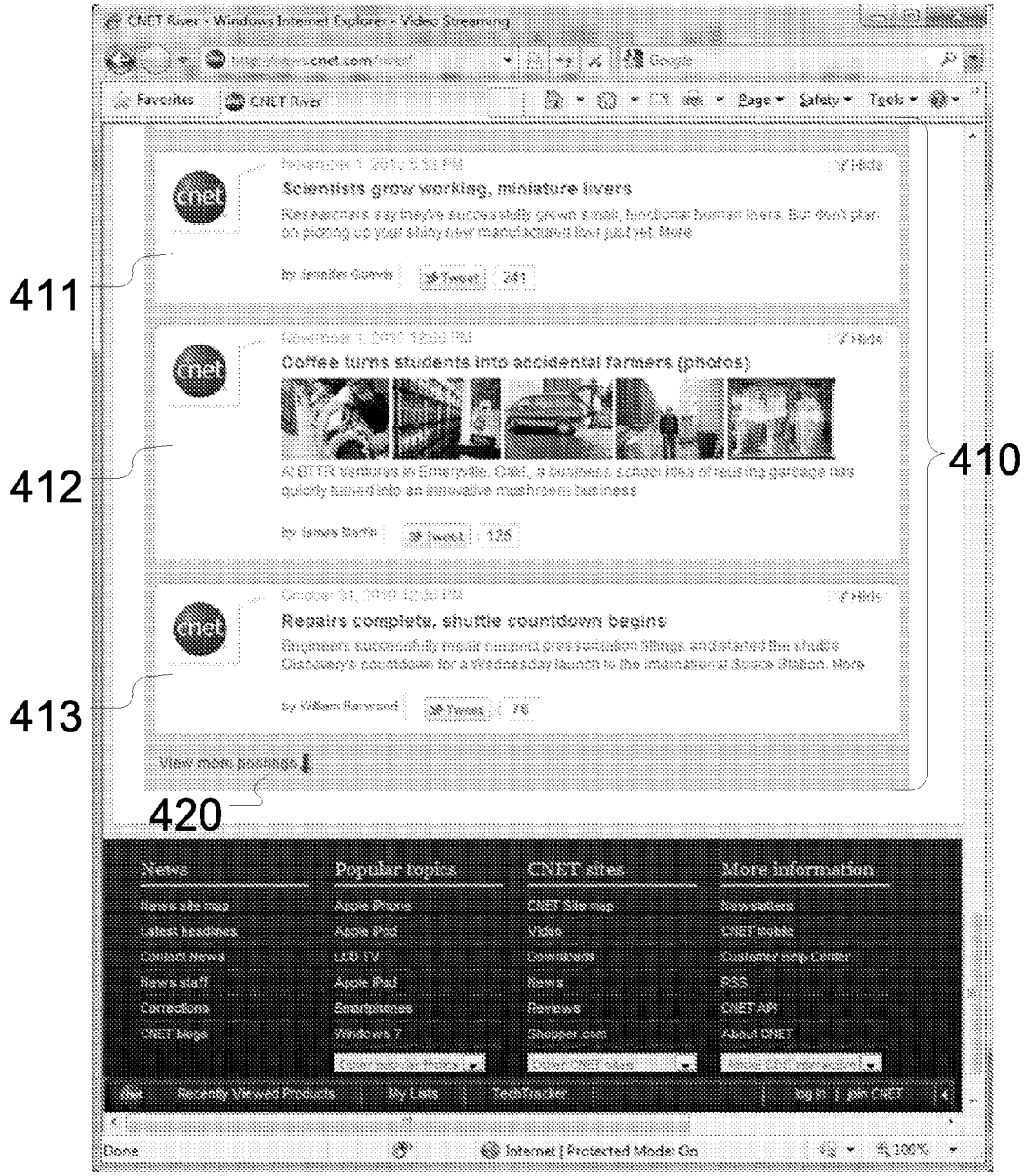
FIG. 4A is a screenshot of an exemplary dynamic webpage.

FIG. 4A is a screenshot of an exemplary dynamic webpage 400. Webpage 400 includes a list 410 of social media entries, for example entries 411, 412, and 413. In the markup language of webpage 400, list 410 may include a tag indicating that it is a page element and indicating a name for the page element. For example, the source code for webpage 400 may include <ul id="pe-socialMediaMain">, "pe" indicating that the tag is directed toward a page element and "socialMediaMain" being the name of the page element. Of course, while this exemplary page element is a list, any other page element type may be used, for example a DIV. Webpage 400 may also include a "view more postings" control 420. "View more postings" control 420 may be, for example, an AJAX control configured to receive a user's selection of the control as a triggering activity event. For example, "view more postings" control 420 may be coded as <a id="ajaxMorePostings">View more postings</a>. In response to a user selecting the "view more postings" control 420, a function (e.g., a JavaScript function) executed on the client computing device may generate a URL to transmit to a server the activity event. For example, a JavaScript function may generate the URL:

```
http://news.domain.com/8329-31116__3-0-
0.html?sites=1%2C3%2C4%2C7
%2C9%2C109%2C105%2C53%2C134%2C102&start=1&activityname
=RiverUpdater&nomesh=true
```

The URL may include various encoded information, including an indication of the triggering activity event (e.g., "activityname=RiverUpdater") among other information.

Once the server computing device receives the request from the client computing device, the server computing device may determine whether the activity event qualifies for a response. In this example, the RiverUpdater activity qualifies for a response, so a server computing device may then process rules to determine the page element to be updated and the appropriate content for the updated the page element. The following is exemplary pseudo code for updating rules:

```
<container activityEventid="elementsUpdater" p:isAdEvent="false"
parent="ajaxActivityEventOpt">
    <property name="pageElementViews">
        <list>
            <value>ElementViewItem0</value>
            <value>ElementViewItem1</value>
        </list>
    </property>
</container>
```

A server computing device may include one or more local databases or other data stores specifying rules and content for updating page elements or may request such data from one or more operatively coupled (e.g., networked) computing devices, such as those shown in FIG. 2. A server computing device may then form a response including metadata and the content of at least one page element. The metadata may indicate the at least one page element and the content of the at least one page element. In this example, a response may appear as follows, with code (e.g., HTML) setting forth content configured to be inserted into a page element being inserted at each ellipsis.

```
<RiaResponse>
    <activityEventName />
    <isadevent>false</isadevent>
```

```
        <pageElement>
            <name>.socialMediaMain</name>
            <html>
                <![CDATA[ ... ]]>
            </html>
        </pageElement>
        <pageElement>
            <name>.riverCounter</name>
            <html>
                <![CDATA[ ... ]]>
            </html>
        </pageElement>
    </RiaResponse>
```

As shown by the above exemplary response, a single triggering activity event may refresh or fetch additional content for multiple page elements. In this case, in addition to fetching additional social media entries to insert in the list defined as page element socialMediaMain (i.e., id="pe-socialMediaMain"), an additional page element indicating the total number of received social media entries since the last request may be updated (i.e., id="pe-riverCounter"). Further, while this exemplary response omits the activity name, others may include it. Of course, other or additional data may be included in the response as well. Additionally, this exemplary response indicates that the triggering activity event was not an ad refresh event (i.e., "<isadevent>false</isadevent>").

Figure 4B:
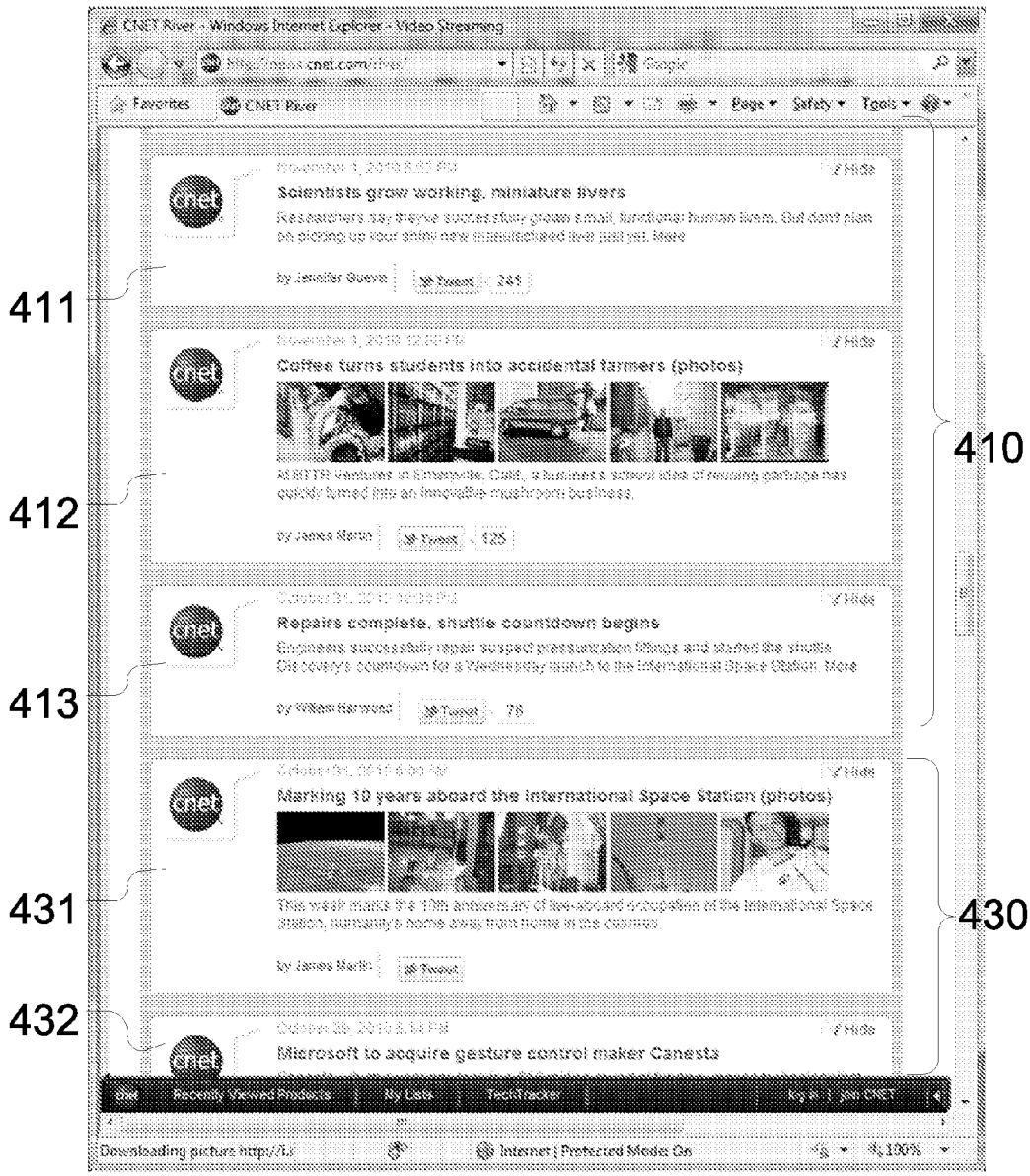
FIG. 4B is a screenshot of the webpage of FIG. 4A having additional list content inserted in a page element.

Upon receipt of the response from a server computing device, a browser on the client computing device may parse the metadata indicating one or more page elements and content of the page elements. The browser may then insert the content of the one or more page elements into the dynamic webpage. FIG. 4B shows webpage 400 having additional list content 430, including social media elements 431 and 432 inserted in the list. In this example, the replacement page element contains the original content and additional content appended at the end of the list. Of course, other replacement page elements may have additional content prepended at the beginning, the entire contents replaced, or may be otherwise updated. Independent of the manner in which the replacement page element may be updated, the replacement page element may be a direct replacement for a predecessor page element. By dynamically adding additional content to the replacement page element (i.e., appending additional lines to the list in this case) and then replacing a predecessor page element with the replacement page element without refreshing the entire page, a user may continue to read or otherwise interact with the remainder of the page. Additionally, because only the replacement page element having the additional or refreshed content needs to be transmitted, a browser may more quickly update the page, thus further minimizing interference with a user's browsing experience. Moreover, processing resources may be reduced on the client side because the replacement page element may be entirely preconstructed on the server side before transmission to the client.

While the above exemplary embodiments may transmit to a client one or more page elements in any format that may be directly inserted into a dynamic page, alternative embodiments may transmit to a client data in other formats. For example, an embodiment may transmit to a client a number, a date, or any other data in a response. Such a response may include only the data or may include metadata configured to instruct the dynamic webpage what to do with the received data. For example, metadata may identify the data being transmitted, and instruct a page element to insert the data into part of the page element and to format the data in a specific manner. Such embodiments may reduce consumption of server-side resources while increasing consumption of client-side resources.

The above examples show systems and methods for updating websites having relatively simple rules. However, the same systems and methods may implement more complex rules to provide a website with the most relevant page element content, ad content, or other content. For example, in the search example of FIG. 3, a rule may limit the content for search results page element 320 to include only laptops sold within a certain geographical area centered around the client computing device. Such rules may be particularly useful to a user of a mobile computing device where a specific geographic location, for example based on global position satellites ("GPS"), may be provided in the request. In another example, a function executed on the client computing device to generate a request after a triggering activity event may include in the request an indication of whether the client computing device is a mobile device or not. The server computing device may then have a rule to transmit content specifically configured for the display of the mobile device, for example images in a page element may be reduced in size (e.g., thumbnails) or a list of content in a page element may be reduced from fifty lines to ten lines.

Additionally, rules may assist with refreshing content other than page elements, such as creatives. For example, a conquest rule may exist indicating that when a creative is to be refreshed, the creative should be refreshed to advertise a product or service competing with the content comprising one or more page elements on the page. For example, in response to a user's search for DELL™ in FIG. 3, a serving computing device may receive a request indicating that DELL™ is the search term, that search results page element 320 is to be refreshed, and that ad 340 should be refreshed. A conquest rule may then instruct a serving computing device to refresh ad 340 with a creative for a competitor of DELL™. Thus, the response may include an ad for APPLE™ as well as metadata indicating that the APPLE™ ad is to be inserted in place of ad 340. Alternatively, an aligned rule may exist indicating that when a creative is to be refreshed, the creative should be refreshed to advertise a product or service aligned with the content comprising one or more page elements on the page. In such an embodiment, the response may include a DELL™ ad in response to receipt of a DELL™ search term. Of course, other rules may be applied for determining creatives in accordance with various business models. Thus, embodiments allow for creatives displayed to a user to be more relevant to a user's activity on the page.

Additionally, embodiments disclosed herein provide for a generic framework for identifying (e.g., tagging) one or more page elements in the source code of a dynamic website, receiving from a browser requests to refresh one or more of the page elements, generating a response including updated contents for one or more page elements and metadata identifying the one or more page elements in the source code to update, and transmitting the response to the browser. This generic framework may allow developers to quickly develop pages across different RIAs without having to produce new code over and over again. Such a framework may be scalable and easy to maintain.

The uniform structure of embodiments may additionally allow a page element to be refreshed with altogether different content. For example, link page element 335 may be a widget or any other content on an initial page load of website 300. However, in response to a search activity event, a response may contain two ads, among other page elements, and the metadata of the response may indicate that a first ad is to be inserted in place of link page element 335 and that a second ad is to be in place of ad 340. Alternatively, in response to a search activity event, a page element having streaming video for an ad may be refreshed in search results page element 320. In such an example, the termination of the streaming video, for example after a fifteen second ad streaming video, may be a triggering action event, and a rule may provide that the content of search results page element 320 may then be refreshed with the search results. Thus, embodiments allow for further customization of a page in response to an activity event.

In the above examples, the page elements are defined in static locations on the webpage. However, these methods and systems may also be useful for updating page elements on personalized websites. Personalized websites may allow individual users to define what page elements are displayed on a page and may allow the user to define the position of various page elements on the page. Personalized websites also may have associated user profiles determining which page elements the user whishes to refresh in response to specific triggering activity events. For example, a user may wish to refresh a news widget, a first page element, in response to a particular user event without disrupting a streaming video, a second page element. Thus, embodiments may allow customization depending on a particular user's preferences.

Embodiments may include other functions on the client-side to further improve navigability and performance of an RIA. For example, a function, such as a JavaScript function, may be configured to locally store a page element and associated metadata before the page element is replaced after an activity event. For example, a function executed on the client computing device may create a last in, first out ("LIFO") queue in the memory of the client computing device to store the page elements. An RIA may then have a "back" control (not shown in the drawings) configured to dynamically allow a user to go back. In other words, in response to a user selecting the back control in the RIA, a last version of the page element may be fetched from the LIFO queue and, according to the associated metadata, inserted back into the dynamic webpage. Thus, a user may quickly and conveniently navigate back within a dynamic webpage without having to refresh the entire page. Additionally, because the past page elements and metadata may be stored locally, backward navigation by a user may be extremely quick due to the absence of data transmission across a network.

Embodiments may also allow for user interaction tracking functionality. For example, functions in a webpage may be configured to have the webpage submit a request in response to every user action that triggers an activity event. While not all user actions may qualify for a response, all user actions may be tracked to provide additional information about the user. For example, a user browsing an online catalog of computers may mouse over many more images of netbooks than full-size laptops shown in the online catalog. The website hosting the online catalog may have associated functions defining that a mouse-over of an image may be a triggering activity event, thus each time the user mouses over an image, a function executed on the client computing device may submit a request to a server computing device. A rule may define that a mouse over of an image does not qualify for a response, but the server computing device still may store the information and associate the information with the user (e.g., with a user ID if the user is logged in or with an IP address). Thus, a server computing device may build a data store of data tracking a user's activities. This data store may be useful for mining user tracking data to determine, for example, recommended products for the user navigating the online catalog or directed advertising.

Further, page elements may be configured to load asynchronously in order to reduce perceived page load times on an initial page load. For example, place holders (e.g., frames) may be defined on an initial page load to receive non-HTML page elements that require a greater load time than HTML page elements, such as images, creatives, and streaming content. For such page elements, the actual page element may be loaded at the end of the page (i.e., anywhere after the faster-loading page content) and inserted into the place holders (e.g., frames) to allow the remainder of the page to load quickly, thus more quickly providing a user with the faster-loading portions of the page. Alternatively, a function defined at the end of the page may be executed to request the page elements from a server computing device and then a response, including the page element and metadata, may be received in similar fashion to the examples provided above. The page element may then be inserted into the page according to the metadata.

Moreover, on an initial page load, a function may be executed to determine whether the page is being requested by a user or by a search bot (e.g., web crawler or spider). Based on the function's determination, a computing device may define an order for page elements to load. In this fashion, a page may be perceived to load more quickly to a human because they can observe and interact with the fast-loading portions of the page while slower portions load at the end of the page. Of course, this may not matter to a bot that may wait to receive the entire page for indexing purposes before moving on.

Embodiments disclosed herein may also be useful for updating rich internet applications and pages according to new and evolving technologies. By way of example only, embodiments may implement Comet web application techniques and transition effects. Of course, other emerging These embodiments may be implemented with software executed on hardware, for example, functional software modules executed on computing devices such as computing device 510 of FIG. 5. Embodiments may, for example, execute modules corresponding to data flow 100. Of course, steps may be performed by more than one module, a single module may perform more than one step, or any other logical division of steps of data flow 100 may be used to implement the data flow as software executed on one or more computing devices.

Computing device 510 has one or more processing device 511 designed to process instructions, for example computer readable instructions (i.e., code) stored on a storage device 513. By processing instructions, processing device 511 may perform the steps set forth in data flow 100. Storage device 513 may be any type of storage device (e.g., an optical storage device, a magnetic storage device, a solid state storage device, etc.), for example a non-transitory storage device. Alternatively, instructions may be stored in remote storage devices, for example storage devices accessed over a network or the Internet. Computing device 510 additionally has memory 512, an input controller 516, and an output controller 515. A bus 514 operatively couples components of computing device 510, including processor 511, memory 512, storage device 513, input controller 516, output controller 515, and any other devices (e.g., network controllers, sound controllers, etc.). Output controller 515 may be operatively coupled (e.g., via a wired or wireless connection) to a display device 520 (e.g., a monitor, television, mobile device screen, touch-display, etc.) in such a fashion that output controller 515 can transform the display on display device 520 (e.g., in response to modules executed). Input controller 516 may be operatively coupled (e.g., via a wired or wireless connection) to input device 530 (e.g., mouse, keyboard, touch-pad, scroll-ball, touch-display, etc.) in such a fashion that input can be received from a user (e.g., a user input may trigger an activity event, causing one or more page elements or creatives on a website to refresh).

Figure 5:
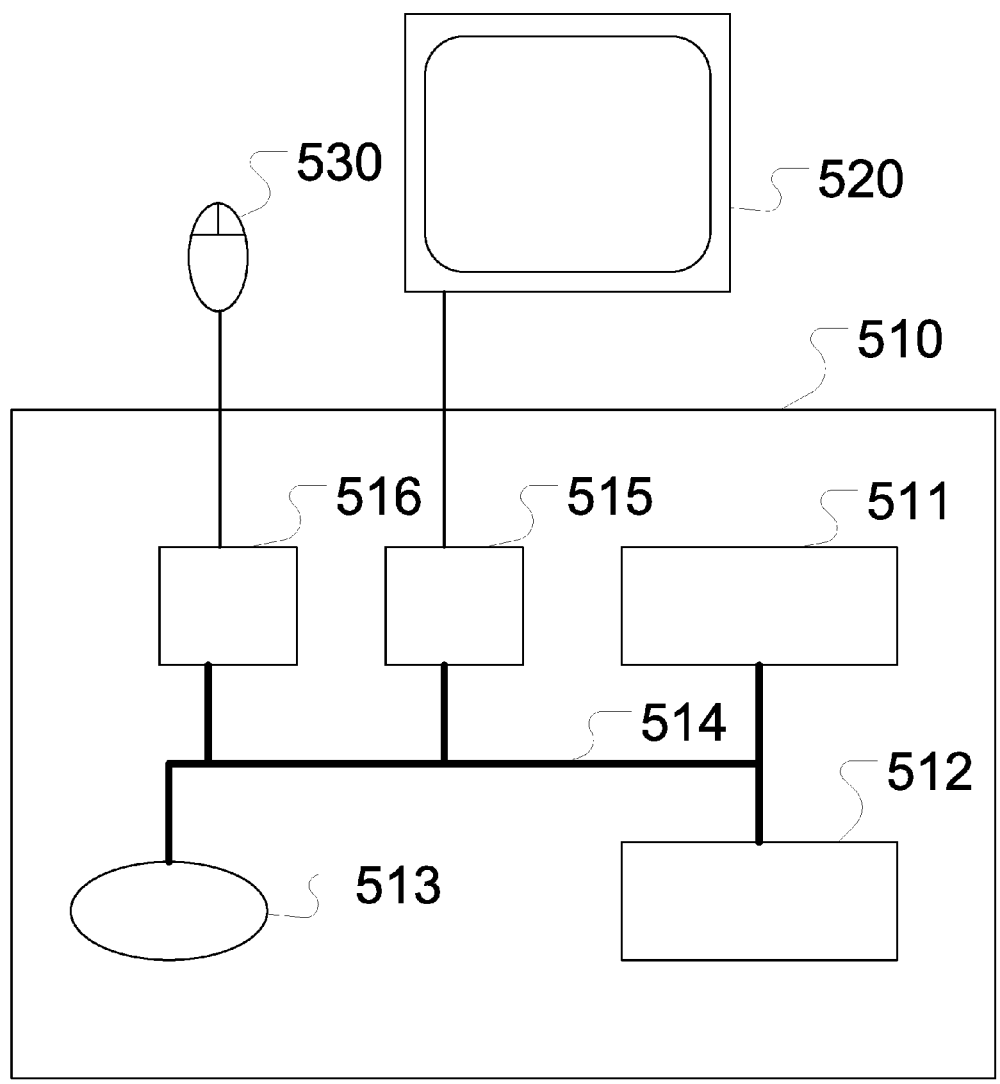
FIG. 5 shows a computing device useful for performing processes disclosed herein.

Of course, FIG. 5 illustrates computing device 510, display device 520, and input device 530 as separate devices for ease of identification only. Computing device 510, display device 520, and input device 530 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 510 may be one or more servers, for example a farm of networked servers, a clustered server environment, or a cloud network of computing devices, configured to serve web pages and/or ad content.

Throughout this application, RIAs, websites, webpages, pages, and other equivalent terms are used generically to refer to pages that may dynamically load content without reloading the entire page. Additionally, terms such as database and data store are used generically to refer to any data structure stored on a memory device that may logically store and retrieve data.

Embodiments have been disclosed herein. However, various modifications can be made without departing from the scope of the embodiments as defined by the appended claims and legal equivalents.

What is claimed is:

1. A method for dynamically providing updated content to a client device, the method performed by one or more servers in communication with the client device and comprising:
   receiving, from a browser of the client device, a content request based on a trigger event on a page rendered by the browser, the rendered page comprising a plurality of elements;
   determining, from the content request, one or more of the plurality of elements to be updated;
   retrieving, from a content resource, content elements to replace the one or more elements to be updated;
   packaging the retrieved content elements in a response to the content request;
   generating metadata for the packaged response, the metadata comprising location tags to enable the browser to render the retrieved content elements in place of the one or more elements to be updated; and sending the packaged response to the browser to update the page;
   wherein the one or more servers implement a conquest rule to retrieve content elements, the method further comprising:
   identifying, from the content request, that the rendered page includes content corresponding to a specified product or service;
   utilizing the conquest rule to retrieve one or more advertisements for products or services in commercial competition with the specified product or service; and
   packaging the one or more advertisements in the packaged response.

2. The method of claim 1, wherein the trigger event comprises a user search for the specified product or service.

3. A method for dynamically providing updated content to a client device, the method performed by one or more servers in communication with the client device and comprising:
   receiving, from a browser of the client device, a content request based on a trigger event on a page rendered by the browser, the rendered page comprising a plurality of elements;
   determining, from the content request, one or more of the plurality of elements to be updated;
   retrieving, from a content resource, content elements to replace the one or more elements to be updated;
   packaging the retrieved content elements in a response to the content request;
   generating metadata for the packaged response, the metadata comprising location tags to enable the browser to render the retrieved content elements in place of the one or more elements to be updated; and sending the packaged response to the browser to update the page;
   further comprising:
   identifying, from the content request, a number of placeholders defined on the rendered page, the place-holder to receive non-HTML page elements requiring longer loading time than HTML elements; and
   retrieving the non-HTML page elements along with the retrieved content elements, the retrieved content elements comprising HTML page elements;
   wherein generating the metadata for the packaged response comprises instructions to load the non-HTML page elements after the HTML page elements in order to optimally present faster-loading content on the rendered page.

4. A method for dynamically providing updated content to a client device, the method performed by one or more servers in communication with the client device and comprising:
   receiving, from a browser of the client device, a content request based on a trigger event on a page rendered by the browser, the rendered page comprising a plurality of elements;
   determining, from the content request, one or more of the plurality of elements to be updated;
   retrieving, from a content resource, content elements to replace the one or more elements to be updated;
   packaging the retrieved content elements in a response to the content request;
   generating metadata for the packaged response, the metadata comprising location tags to enable the browser to render the retrieved content elements in place of the one or more elements to be updated; and sending the packaged response to the browser to update the page;
   determining whether a user or a search bot transmitted the content request;
   in response to determining that a user transmitted the content request, defining, in the metadata, an asynchronous order for the retrieved content elements to be loaded such that faster-loading page elements are loaded prior to slower-loading elements.

5. A method for dynamically providing updated content to a client device, the method performed by one or more servers in communication with the client device and comprising:

receiving, from a browser of the client device, a content request based on a trigger event on a page rendered by the browser, the rendered page comprising a plurality of elements;
determining, from the content request, one or more of the plurality of elements to be updated;
retrieving, from a content resource, content elements to replace the one or more elements to be updated;
packaging the retrieved content elements in a response to the content request;
generating metadata for the packaged response, the metadata comprising location tags to enable the browser to render the retrieved content elements in place of the one or more elements to be updated; and sending the packaged response to the browser to update the page;
determining whether a user or a search bot transmitted the content request;
in response to determining that a search bot transmitted the content request, generating the metadata to instruct the browser to synchronously load the content elements.

6. A system comprising:
a non-transitory memory storing instructions for dynamically providing updated content to a client device;
a processor coupled to the memory to execute the instructions, causing the processor to:
  receive, from a browser of the client device, a content request based on a trigger event on a page rendered by the browser, the rendered page comprising a plurality of elements;
  determine, from the content request, one or more of the plurality of elements to be updated;
  retrieve, from a content resources, content elements to replace the one or more elements to be updated;
  package the retrieved content elements in a response to the content request;
  generate metadata for the packaged response, the metadata comprising location tags to enable the browser to render the retrieved content elements in place of the one or more elements to be updated; and
  sending the packaged response to the browser to update the page;
wherein the instructions include a conquest rule to retrieve content elements, and wherein the executed instructions further cause the processor to:
  identify, from the content request, that the rendered page includes content corresponding to a specified product or service;
  utilize the conquest rule to retrieve one or more advertisements for products or services in commercial competition with the specified product or service; and
  package the one or more advertisements in the packaged response.

7. The system of claim 6, wherein the trigger event comprises a user search for the specified product or service.

8. A system comprising:
a non-transitory memory storing instructions for dynamically providing updated content to a client device;
a processor coupled to the memory to execute the instructions, causing the processor to:
  receive, from a browser of the client device, a content request based on a trigger event on a page rendered by the browser, the rendered page comprising a plurality of elements;
  determine, from the content request, one or more of the plurality of elements to be updated;
  retrieve, from a content resources, content elements to replace the one or more elements to be updated;
  package the retrieved content elements in a response to the content request;
  generate metadata for the packaged response, the metadata comprising location tags to enable the browser to render the retrieved content elements in place of the one or more elements to be updated; and
  sending the packaged response to the browser to update the page;
wherein the executed instructions further cause the processor to:
  identify, from the content request, a number of placeholders defined on the rendered page, the placeholder to receive non-HTML page elements requiring longer loading time than HTML elements; and
  retrieve the non-HTML page elements along with the retrieved content elements, the retrieved content elements comprising HTML page elements;
wherein generating the metadata for the packaged response comprises instructions to load the non-HTML page elements after the HTML page elements in order to optimally present faster-loading content on the rendered page.

9. A non-transitory computer-readable medium storing instructions for dynamically providing updated content to a client device, wherein the instructions, when executed by one or more servers, cause the one or more server to perform operations comprising:
receiving, from a browser of the client device, a content request based on a trigger event on a page rendered by the browser, the page comprising a plurality of elements;
determining, from the content request, one or more of the plurality of elements to be updated;
retrieving, from a content resource, content elements to replace the one or more elements to be updated;
packaging the retrieved content elements in a response to the content request;
generating metadata for the packaged response, the metadata comprising location tags to enable the browser to render the retrieved content elements in place of the one or more elements to be updated; and
sending the packaged response to the browser to update the page;
wherein the instructions include a conquest rule to retrieve content elements, and wherein the executed instructions cause the one or more servers to perform further operations comprising:
identifying, from the content request, that the rendered page includes content corresponding to a specified product or service;
utilizing the conquest rule to retrieve one or more advertisements for products or services in commercial competition with the specified product or service; and
packaging the one or more advertisements in the packaged response.

10. The non-transitory computer-readable medium of claim 9, wherein the trigger event comprises a user search for the specified product or service.

* * * * *